May 11, 1965  K. A. BASFORD  3,182,774
CONTROL MECHANISM FOR A GAS TURBINE ENGINE
Filed March 6, 1961  2 Sheets-Sheet 1

United States Patent Office 3,182,774
Patented May 11, 1965

3,182,774
CONTROL MECHANISM FOR A GAS TURBINE ENGINE
Kenneth Arnold Basford, Derby, England, assignor to Rolls-Royce Limited, Derby, England, a British company
Filed Mar. 6, 1961, Ser. No. 93,522
Claims priority, application Great Britain, Mar. 10, 1960, 8,568/60
6 Claims. (Cl. 192—.02)

This invention comprises improvements in or relating to gas-turbine engines.

In practice, particularly when a gas-turbine engine is employed to power an aircraft, the fuel supply is often controlled or adjusted by a manual lever which is connected by an extensive mechanical linkage to adjust a fuel control member disposed adjacent the engine. Such a system suffers from the disadvantage that the mechanical linkage is sensitive to variations in temperature so that the pilot or operator may be required to make constant adjustments of the manual lever to compensate for the effects of expansion and contraction in the mechanical linkage on the setting of the fuel control member.

According to this invention, a control mechanism for a gas-turbine engine comprises a manual lever connected by an extensive mechanical linkage to a fuel control member to permit setting of the member, and means to restrain movement of the fuel control member from its set position but permitting setting of the member by the manual lever, the manual lever being left free for movement to compensate for expansion and contraction of the linkage.

The initial setting of the fuel control member may be effected with the assistance of a position indicator, which may be an electrical synchro device. After such initial setting, the manual lever is left free to move to accommodate expansion and contraction of the linkage.

The initial seting of the fuel control member may be device, or an electrically-operated brake, acting on the control member or on a part of the linkage close to it. When an electrically-operated brake is used it is rendered inoperative during initial adjustment of the fuel control member.

There may also be provided power means, for instance an actuator of the kind including an electric motor, connected to move the fuel control member through the mechanical linkage. For instance, the power means may be coupled to the manual lever through a clutch capable of being rendered operative when the power means is energised. The power means may also be automatically controlled so that the fuel control member is adjusted automatically under some conditions of engine operation; in one such arrangement the power means is controlled to maintain a preselected temperature in the turbine whilst the engine is operating in a selected rotational speed range.

Some arrangements of this invention are illustrated in the accompanying diagrammatic drawings, in which.

Figure 1:
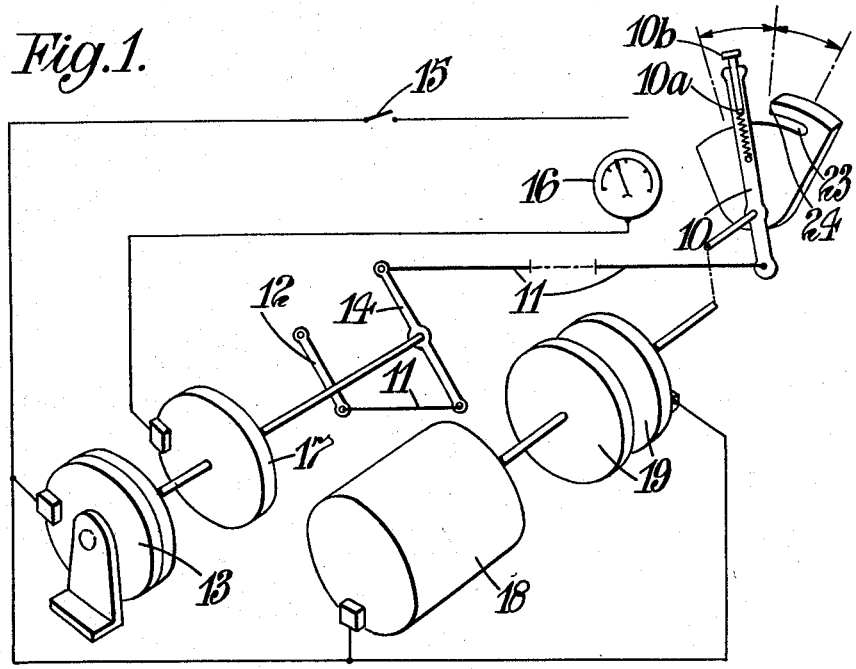
FIGURE 1 illustrates diagrammatically a first arrangement.

The arrangement shown in FIGURE 1 comprises a manual lever 10, which will be located in the cockpit of an aircraft, connected by an extensive mechanical linkage 11 to a temperature trim lever 12 which is mounted on an engine of the aircraft. Thus if the lever 10 is held fixed, the temperature trim lever 12 will alter in position on expansion and contraction of the linkage 11.

In order to avoid this difficulty, the manual lever 10 is left free and means is provided to restrain movement of the temperature trim lever 12 so that expansion and contraction in the linkage 11 is accommodated by movement of the lever 10.

In the arrangement illustrated the means comprises an electrically disengageable brake 13 which is operative on a lever 14 forming part of the linkage 11, the lever 14 being close to the trim lever 12 so that the position of the lever 12 is substantially unaffected by temperature variations causing expansion and contraction in the portion of the linkage 11 between the lever 14 and the lever 12. Clearly when the brake 13 is engaged the lever 14 and thus the temperature trim lever 12 are restrained against movement and any expansion and contraction in the linkage 11 between lever 14 and the manual lever 10 is accommodated by pivoting of the lever 10.

The position of the lever 14 and thus of the temperature trim lever 12 is indicated by means of a synchro device 17 feeding a signal to a position indicator 16 and manual setting of the temperature trim lever 12 is effected by observing its position on the position indicator 16 and by adjusting the lever 10 until the desired position is reached.

Closure of a manual switch 15 energizes the brake 13 to disengage the same, and it follows therefore that unless this switch is closed the brake will be engaged. Therefore the restraining torque applied by the brake 13 should not be excessive but should be such that the pilot can overcome it when adjusting the position of the temperature trim lever 12 manually by lever 10.

The arrangement shown also provides alternative means to enable the temperature trim lever 12 to be set in any desired position, this alternative means being under control of the manual switch 15. This means comprises power means in the form of an electrically-operated actuator 18, for example an electric motor, and an electrically operated clutch 19 which when operative connects the actuator 18 drivingly to the manual lever 10. The supply of current to both the actuator 18 and the clutch 19 is effective by closure of the switch 15. Thus, when the switch 15 is closed, not only is the brake 13 disengaged but also the actuator 18 is operated to drive the lever 10 through the clutch 19. When it is seen from the position indicator that the temperature trim lever is in its appropriate position the switch 15 is opened so disconnecting the power drive to manual lever 10 and rendering brake 13 operative.

Figure 2:
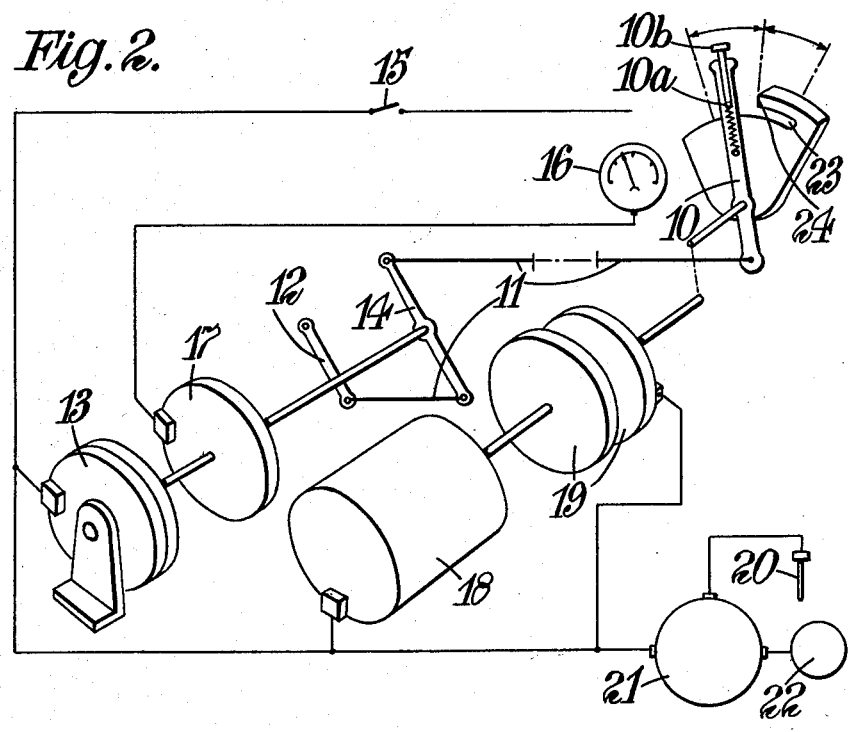
FIGURE 2 illustrates an arrangement similiar to FIGURE 1 in which additional controls are provided.

The arrangement shown in FIGURE 2 is the same as that shown in FIGURE 1 but an additional control is provided by which the position of the temperature trim lever is adjusted automatically to maintain a selected temperature at a point in the turbine of the gas turbine engine with which the system is associated. The system further includes a temperature-responsive element, such as a thermocouple 20, which is fitted in the turbine of the engines and which feeds a temperature signal to a comparator and amplifier unit 21. In this unit the signal from the thermocouple 20 is compared with a second signal developed in the unit and pre-set to represent the turbine temperature required and in the event that the temperature sensed by the thermocouple 20 differs from the selected temperature current is fed to the brake 13, actuator 18 and clutch 19 so that the temperature trim lever is adjusted to vary the fuel supply to the engine until the turbine temperature is at its selected value. The temperature control may, for example, be rendered operative in a particular speed range of engine operation, for example, under cruise conditions and for this purpose there is provided a speed-responsive device in the form of a tachometer generator 22 which cuts in the comparator and amplifier unit in the appropriate speed range.

In each of the arrangements of FIGURES 1 and 2, the manual lever 10 is not only employed to set the temperature trim lever 12, but is also arranged to operate a manual feathering lever by which the normal propeller control unit can be over-ridden to cause the propeller to feather, the manual feathering lever being moved to its operative setting on starting up of the engine, and also to operate a shut-off cock in the engine fuel system. These two operations and the setting of the temperature trim lever are effected in separate ranges of movement of the lever 10. For instance in the arrangement shown, as the lever 10 is moved counter-clockwise from the right-hand limit of its angular movements, the manual feathering lever is first rendered inoperative, the shut-off cock is opened and then the temperature trim lever is set. In order that the movements of the lever 10 in one range of its movement do not effect the controls which are to be operated in its other ranges of movement, a mechanism such as is described in U.S. Patent No. 3,067,628, granted December 11, 1962, may be incorporated in the linkage 11 between the lever 10 and the lever 14. The lever 10 is provided with a catch 10a which runs in a slot 23 during operation of the manual feathering lever and of the shut-off cock but which when the lever is moved into the temperature trim range moves radially outwardly so as to be aligned with a shoulder 24. Thus the lever cannot be moved back into the slot 23 until the catch is disengaged from the shoulder by depressing button 10b carried by the lever 10.

Figure 3:
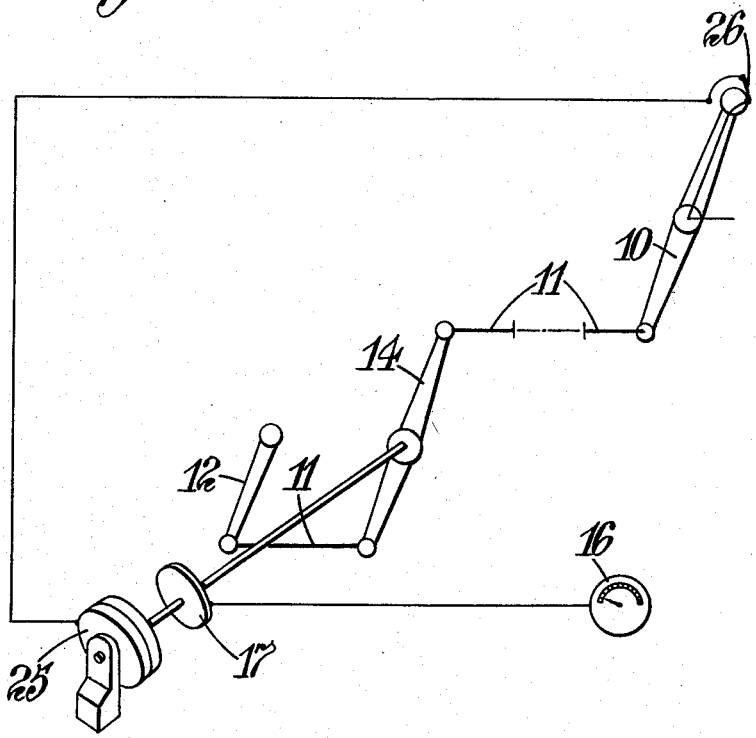
FIGURE 3 illustrates a third arrangement.

Referring now to FIGURE 3, there is shown an arrangement in which an adjustable friction brake 25 is employed in place of the electrically-operated brake 13 and in which setting of the temperature trim lever 12 is effected solely by the manual lever 10. Alternatively the brake may be electrically operated under control of a switch 26 mounted on the lever 10.

The braking torque applied by the brake 25 will be selected to exceed the frictional torque in the linkage 11 between the lever 14 and the lever 10, so that any expansion or contraction in the linkage between these two levers is accommodated by movement of the lever 10.

Clearly the brake restraining movement of the temperature trim lever 12 can be applied directly to this lever or to any other part of the linkage 11 close to it.

I claim:
1. A control mechanism comprising an adjustable fuel control member, a freely-pivoted manual lever, an extensive mechanical linkage connected at one end to said manual lever and at its other end to said fuel control member, so that manual operation of the manual lever effects adjustment of said fuel control member, and friction brake means, frictionally restraining said mechanical linkage adjacent said fuel control member, whereby to restrain said fuel control member against movement as a result of expansion and contraction of the mechanical linkage, said expansion and contraction of the mechanical linkage being accommodated by free pivoting of the manual lever, said friction brake means being such that manual operation of said manual lever can override the frictional restraint of said friction brake means whereby the linkage and hence the fuel control member can be adjusted.

2. A control mechanism comprising an adjustable fuel control member, a shaft, a lever member attached to the shaft for pivotal movement about its axis, the lever member being adjacent the fuel control member, a pivotally mounted manual lever, an extensive mechanical linkage formed from a first portion and a second portion, the first portion connecting the lever member and the fuel control member, and the second portion connecting the lever member and the manual lever so that manual operation of the manual lever causes pivotal movement of the lever member on said shaft and hence adjustment of the fuel control member, friction brake means frictionally restraining said shaft and hence the lever member against said pivotal movement as a result of expansion and contraction of the said second portion of the mechanical linkage, said expansion and contraction being accommodated by free pivoting of the manual lever, said friction brake means being such that manual operation of said manual lever can override the frictional restraint of said friction brake means whereby the linkage and hence the fuel control member can be adjusted.

3. A control mechanism according to claim 2 wherein the friction brake means comprises electrical means and including a source of electrical power which can be connected to said electrical means to cause the friction brake means to disengage from said shaft.

4. In a gas-turbine engine provided with a source of fuel, a control mechanism for controlling the feeding of the fuel to the engine from said source comprising an adjustable fuel control member, a freely-pivoted manual lever, a mechanical linkage including a lever member disposed adjacent said fuel control member, said linkage being sensitive to variations in temperature which cause expansion and contraction thereof, and being connected at one end to said manual lever and at its other end to said fuel control member so that manual operation of the manual lever effects movement of said lever member and said fuel control member, a shaft on which said lever member is mounted and which rotates on movement of said lever member, and friction brake means frictionally restraining said shaft, and thereby said lever member and said fuel control member against movement as a result of said expansion and contraction of said linkage, said expansion and contraction being accommodated by said free pivoting of the manual lever and said friction brake means being such that manual operation of said manual lever can override the frictional restraint of said friction brake means whereby the linkage hence the fuel control member can be adjusted.

5. A control mechanism comprising an adjustable fuel control member, a freely-pivoted manual lever, an extensive mechanical linkage, a lever member mounted on a shaft to permit rocking movement of said lever member on rotation of the shaft, said lever member being disposed adjacent said fuel control member, and said mechanical linkage connecting said lever member with said manual lever and said lever member with said fuel control member, so that manual operation of the manual lever causes rocking movement of said lever member and effects adjustment of the fuel control member, friction brake means normally engaging on said shaft to restain said lever member against said rocking movement, and thereby to restrain said fuel control member against an undesired adjustment due to thermal expansion and contraction of said mechanical linkage, said thermal expansion and contraction being accommodated by free pivoting of the manual lever, and said friction brake means being over-rideable by manual operation of said manual lever, a source of electrical power, electrical means associated with said friction brake means to disengage said friction brake means from said shaft when electrically energized from said source, electrical driving means, a normally disengaged electrically actuable clutch which can be electrically energized from said source to drivingly connect said electrical driving means to the manual lever, and normally open electrical switch means connected to said source and arranged when closed to cause simultaneous energization from said source of said power means, engagement of said electrically actuable clutch, and disengagement of said friction brake mean.

6. A control mechanism according to claim 5, comprising sensing means sensitive to the value of a parameter, the said value being under control of the control mechanism and automatic control means connected to said sensing means and controlling the power means and thereby the control mechanism so as to maintain a desired value of the parameter.

References Cited by the Examiner

UNITED STATES PATENTS

| | | | |
|---|---|---|---|
| 2,195,524 | 4/40 | Starr | 74—491 |
| 2,723,570 | 11/55 | Herrmann | 74—491 |
| 2,912,082 | 11/59 | Wooten | 192—3 |
| 2,916,116 | 12/59 | Eddy et al. | 192—3 |
| 2,936,579 | 5/60 | Reed | 192—2 X |
| 2,946,236 | 7/60 | Joseph | 74—480 |

BROUGHTON G. DURHAM, *Primary Examiner*.